INVENTOR

Jacques Rene Favereau

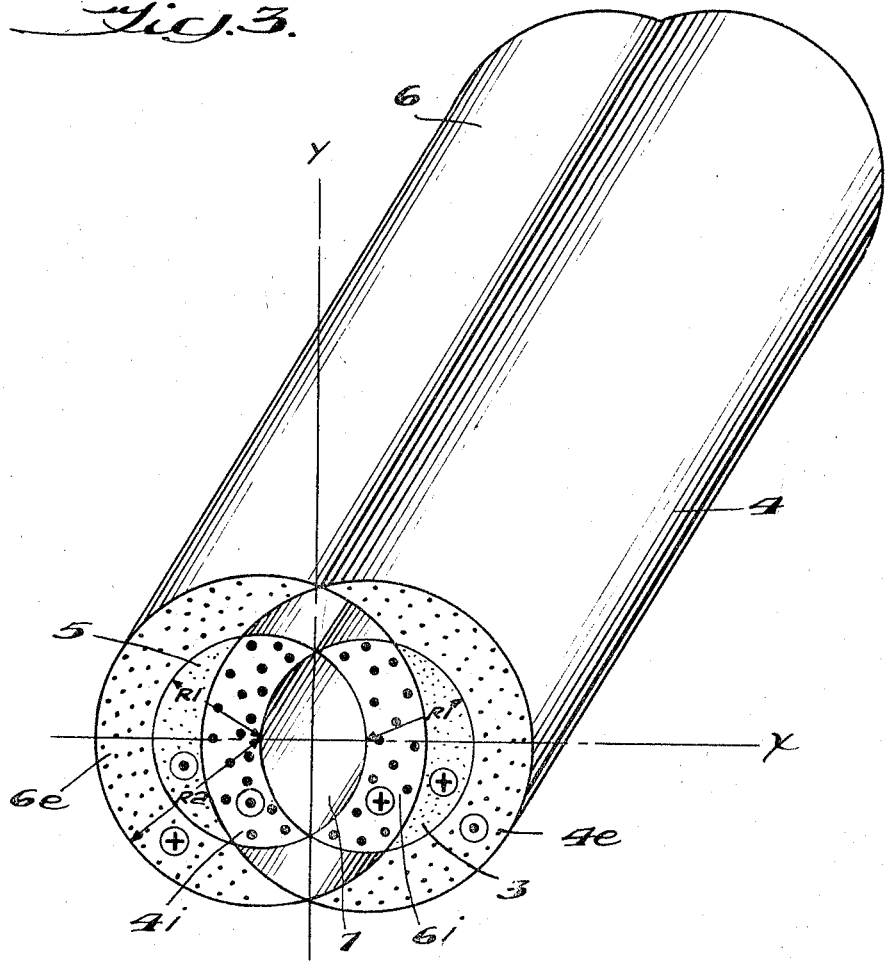

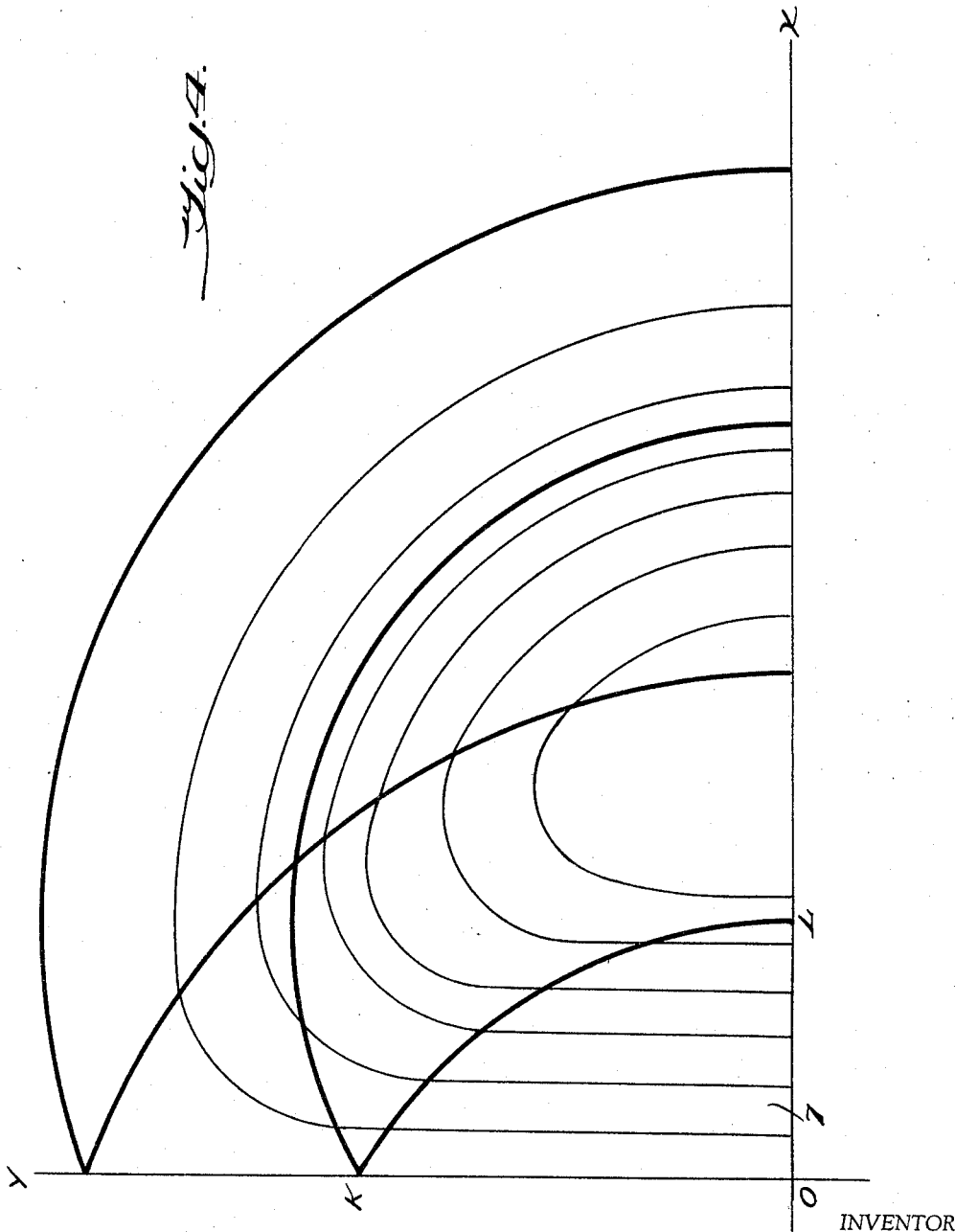

United States Patent Office 3,428,927
Patented Feb. 18, 1969

3,428,927
ARRANGEMENT FOR PRODUCING HOMOGENEOUS MAGNETIC FIELDS WITH VERY HIGH FIELD STRENGTH
Jacques Rene Favereau, Montmorency, France, assignor to Aktiengesellschaft Brown, Boveri & Cie, Baden, Switzerland, a joint-stock company
Filed Dec. 23, 1965, Ser. No. 515,908
Claims priority, application France, Jan. 9, 1965
1,382
U.S. Cl. 335—299                    2 Claims
Int. Cl. H01f 5/00; H01b 5/00

ABSTRACT OF THE DISCLOSURE

Arrangement for producing homogeneous magnetic fields with very high field strengths in which the stray flux in the outside space is eliminated by an electromagnetic effect. A homogeneous field having a very high field strength is produced in the space between two parallel conductors which are traversed by currents of opposite direction and the outer magnetic field is eliminated by means of substantially annular, cylindrical outer conductors the respective cross sections of which and the axial currents assigned to them are correspondingly adapted.

---

The present invention relates to an arrangement for the production of homogeneous magnetic fields of very high field strength, where the stray flux in the outside space is eliminated by electromagnetic means.

It is known in homogeneous magnetic fields with field strengths of the order of up to four Tesla, to keep the stray flux away from the outside space by an outer ferromagnetic shield. This shield, which is arranged outside the homogeneous field zone in a region of lower magnetic flux density, is not yet saturated and can absorb the outer stray flux.

But in the case of stronger fields with field strengths of the order of ten Tesla, for example, as they are to be produced with the arrangement according to the invention, a ferromagnetic shield would be ineffective, in view of iron saturation in the shield, and in addition the field would be deformed in the zone in which it should be homogeneous. The object of the present invention is to produce a homogeneous field of very high field strength in a space between two parallel conductors which are traversed by currents in opposite direction, and to eliminate the outer magnetic field by means of substantially annular, cylindrical outer conductors, the cross sections of these outer conductors and the axial currents traversing them being correspondingly adapted to achieve this objective.

The arrangement according to the invention for the production of a homogeneous magnetic field is characterized by the fact that two groups of parallel conductors are provided, which are traversed by currents of opposite direction and whose cross sections consist of segments or common partial surfaces of two series of circular or annular surfaces which are concentric within each series, a current density being assigned to each surface in such a way that the external field of a cylindrical conductor system corresponding to the surfaces of each series and admitted with the assigned current densities, would disappear, and that each conductor has a current density which corresponds to the sum of the current densities which are assigned to the respective surfaces involved in the formation of the conductor cross section.

The invention and an embodiment thereof will be described more fully on the basis of the attached drawings.

FIG. 3 is a perspective view of another type of multiple coaxial conductor arrangement traversed by currents of opposite direction; and FIG. 4 is a graph depicting distribution of the magnetic flux in the quadrant XOY of the conductor arrangement shown in FIG. 3.

First it will be shown that it is principally possible to make the external magnetic field disappear in a system of cylindrical coaxial conductors which are traversed by currents in both directions of the generatrix.

Figure 1:
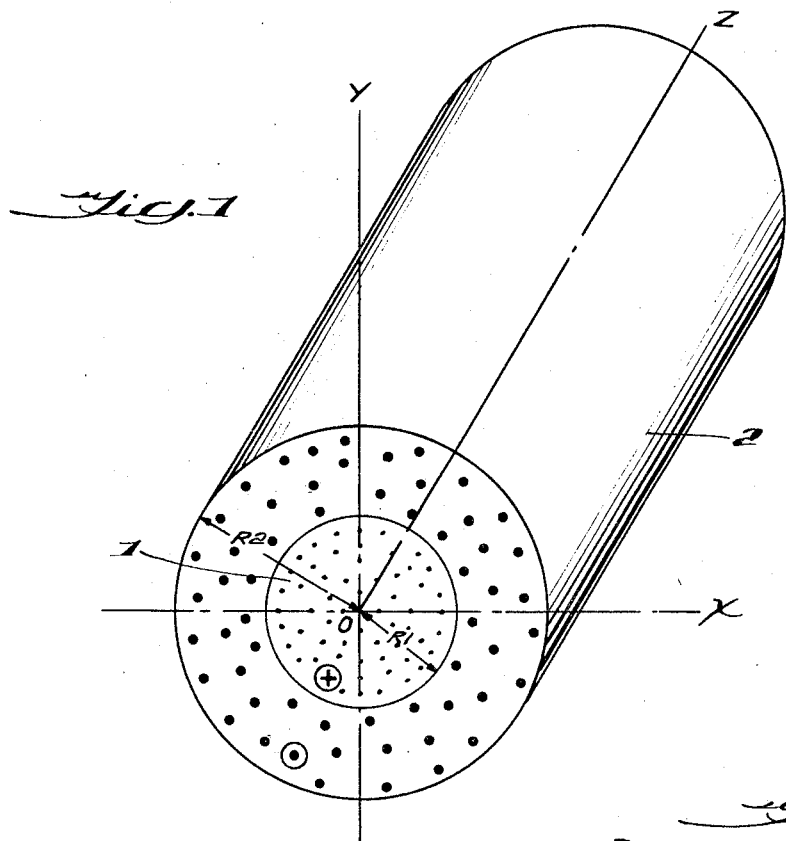
FIG. 1 is a perspective view of a portion of a multiple coaxial conductor arrangement traversed by currents of opposite direction.

FIG. 1 shows, for example, a circular-cylindrical conductor 1 and a ring-shaped conductor 2, both being coaxial to the axis OZ and traversed by currents in opposite direction. The cross sections of the conductors are determined by the radius R1 for the conductor 1 and by the radii R1 and R2 for the conductor 2. The opposite directions of the currents in the two conductors are indicated in the usual manner by the symbols $\ominus$ and $\oplus$.

Figure 2:
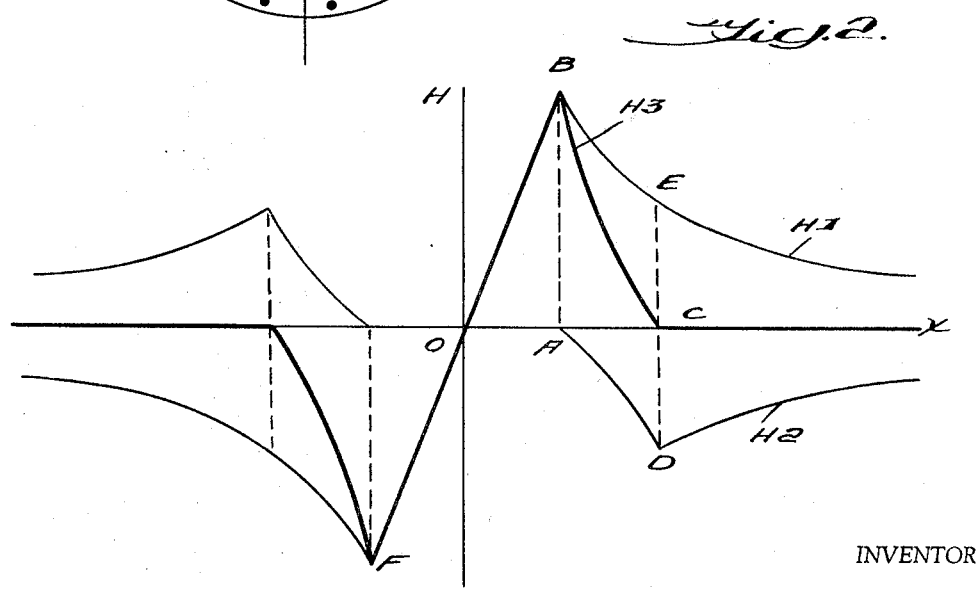
FIG. 2 is a graph showing the course of the magnetic fields produced by the two conductors in the Y-direction for various points along the X-axis.

The curves H1 and H2 in FIG. 2 represent the course of the field produced by the conductors 1 and 2 respectively in Y-direction for points along the X-axis. Both curves are symmetrical to the point of origin. For the region inside the conductor 1, that is, for abscissa values K between 0 and R1, the curve H1 has the form of a straight line OB, while outside the conductor 1 traversed by the current I1, the field drops according to the function $I1/2\pi K$.

The field H2, which is produced by the ring-shaped conductor 2 traversed by the current I2 is zero inside the conductor, that is, between 0 and A with the abscissa value R1. It rises then steadily between the points A and D, corresponding to the abscissa values R1 and R2, to drop finally outside the conductor according to the function $I2/2\pi K$.

To make sure that the field H3 resulting from the action of the two conductors disappears in the outside space, that is, beyond the point C, the currents I1 and I2 must flow in opposite direction, and the ordinates of the points E and D must have the same absolute value, that is, $$\frac{I1}{2\pi R1} = \frac{I2}{2\pi R2}$$

It follows therefrom that I1 and I2 must have the same absolute value.

This condition leads to the following relation between the current densities Δ1 and Δ2 in the conductors 1 and 2 respectively.

$$\Delta 2\pi R1^2 = \Delta 2\pi [R2^2 - R1^2]$$

or $$\Delta 1 = \Delta 2 \left[ \left(\frac{R2}{R1}\right)^2 - 1 \right]$$

Under these conditions the curve H3 has the form indicated in FIG. 2. It extends for the interior of the conductor 1 along the straight line FB and is in agreement with the abscissa axis for the space outside the conductor 2, where the resulting field disappears.

One sees also that the field produced by the conductor 2 does not disturb the field inside the conductor 1.

FIG. 3 shows an embodiment of the arrangement according to the invention, where the properties of concentric cylindrical conductors illustrated on the basis of FIGS. 1 and 2 are utilized.

The arrangement consists of a plurality of parallel cylindrical conductors whose cross sections consist of segments and common partial surfaces of two circular surfaces 3 and 5 with a radius R1 and of two annular surfaces 4 and 6 with an inside radius R1 and outside radius R2, so that the surfaces 3 and 4, on the one hand, and the surfaces 5 and 6, on the other hand, are in agreement with the cross sections of the conductor systems 1 and 2.

It can be shown that a strictly homogeneous field could be produced perpendicularly to the XZ plane in the region of the common partial surface 7 by means of conductors with the cross sectional surfaces 3 and 5, which are admitted with imaginary currents of equal and constant density but opposite direction. Since the imaginary total current through the surface 7 disappears then, a cylindrical cavity can then be formed over the surface 7 as a cross section in which the homogeneous useful field prevails.

As it was explained on the basis of FIGS. 1 and 2, currents of constant density in conductors with the cross sectional surfaces 4 and 6 would not disturb the field in the range of the surface 7. These currents, however, would compensate the fields outside the conductors, produced by conductors with the cross sectional surfaces 3 and 5 respectively.

To the surfaces 3–6 are assigned currents of constant density in such a way that the imaginary concentric conductor system with the cross sections 3 and 4 and 5 and 6 respectively, which would be admitted with these current densities, would have a disappearing external field according to the rules explained on the basis of FIGS. 1 and 2. Since the magnetic field strengths are superposed, just like the producing currents, each conductor is admitted with current densities which correspond to the sum of the current densities assigned to the surfaces involved in the formation of the conductor cross section.

In the embodiment according to FIG. 3, the conductors are arranged symmetrically to the Y-axis. The currents in two conductors, arranged symmetrically to each other, are oppositely directed, but have the same absolute value of the current density. There are three different absolute values of the current densities:

$\Delta\alpha$—for the conductors corresponding to the outer section of the surfaces 3 and 5.

$\Delta\beta$—for the outer ring sections 4e and 6e.

$\Delta\alpha+\Delta\beta$—for the inner ring sections 4i and 6i.

FIG. 4 shows the distribution represented by lines of flux in quadrant XOY according to FIG. 3. The heavy lines indicate the limit of the conductors. In the region between the coordinate axes and the arc XL the lines of flux are parallel and have the same distance; one has here therefore a homogeneous magnetic field.

In order to obtain such a magnetic field with a field strength of the order of 10 Tesla, very high current densities are required in the copper or any other suitable conductor material, which would necessitate very intensive cooling by water, liquid nitrogen, or hydrogen in the case of prolonged operation. The use of super-conductors cooled with liquid helium is also possible.

Naturally each conductor, which is represented solid in the specification for reasons of clarity, is formed in practice of a number of conductors with suitable cross sections. The insulations required between the individual conductors are likewise not represented in the figures.

I claim:

1. Arrangement having parallel conductors for the production of a homogeneous magnetic field in a cylindrical space of a cross section formed by the overlapping surfaces of two eccentric essentially cylindrical surfaces each having an area A, including means for compensating the magnetic field outside of the arrangement to zero, said arrangement comprising two outer cylindrical conductors in which current flows in opposite direction with an average current density of $\Delta\alpha$, said conductors having cross sections formed by the non-overlapped surfaces of two eccentric annular surfaces each having an area B, and each encircling a corresponding circular surface, and two inner cylindrical conductors in which current flows in opposite directions and for each of them in a direction opposite to the current in the neighboring outer conductor, with an average current density of $\Delta\beta$, these conductors having cross sections formed by those partial surfaces of the circular surfaces being respectively non-overlapped by the other circular surface, but overlapped by an annular surface, while the ratio $(\Delta\beta-\Delta\alpha):\Delta\alpha$ is equal to the ratio $B:A$.

2. Arrangement as defined in claim 1 for producing a homogeneous magnetic field and which includes two middle conductors in which current flows in opposite directions and for each of them in the same direction as the current in the adjoining inner conductor, with an average current density of $\Delta\alpha$ being equal to $\Delta\beta-\Delta\alpha$, these conductors having cross sections formed by those partial areas of the circular surfaces being respectively non-overlapped by other cylindrical and annular surfaces.

References Cited

High Magnetic Fields, an article by Stekly et al., pp. 145–148 relied on, 1962.

GEORGE HARRIS, *Primary Examiner.*

U.S. Cl. X.R.

174—126